A. H. PEYCKE.
BRAKE HEAD ADJUSTMENT.
APPLICATION FILED NOV. 17, 1917.
1,299,605. Patented Apr. 8, 1919.
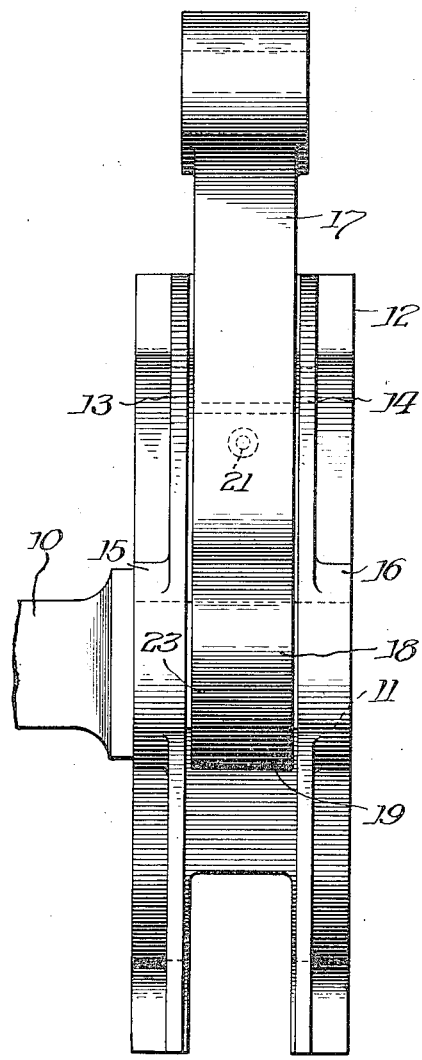
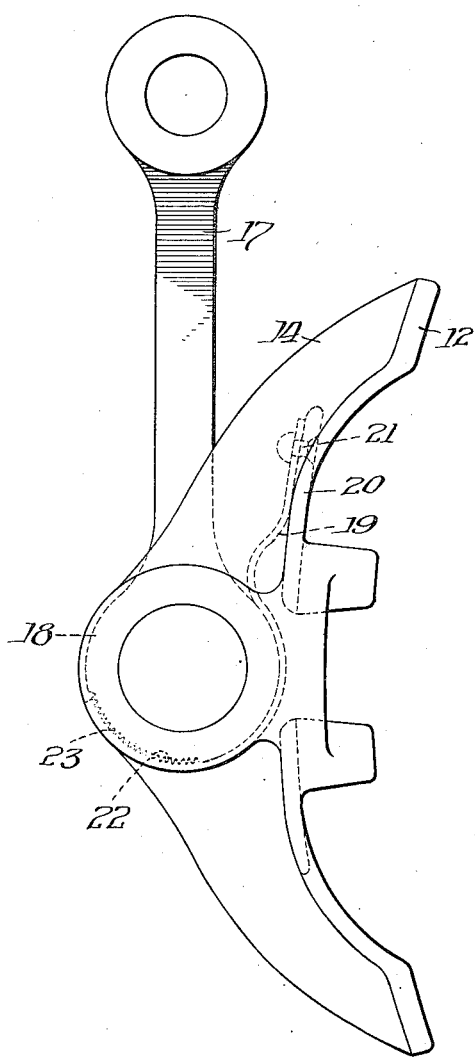
Witnesses
Inventor
Armand H. Peycke
By Wilkinson & Huxley
Attys.

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE-HEAD ADJUSTMENT.

1,299,605.     Specification of Letters Patent.     Patented Apr. 8, 1919.

Application filed November 17, 1917. Serial No. 202,499.

*To all whom it may concern:*

Be it known that I, ARMAND H. PEYCKE, a citizen of the United States, and resident of Chicago, in the county of Cook and State of Illinois, have invented certain new and useful Improvements in Brake-Head Adjustments, of which the following is a specification.

This invention relates to brake mechanism, and more particularly to novel means for the adjustment of brake heads.

One of the objects of the invention is to improve and simplify means whereby a brake head normally may be held yieldably in a given position.

Another object is to connect brake heads and hangers in a novel manner making the same durable and at the same time occupying a minimum amount of space.

Another object is to provide a novel combination of brake head and hanger adapted to meet the various requirements for successful commercial operation.

Generally speaking, these and other objects are accomplished by providing in brake mechanism, the combination of a brake head, a hanger associated therewith, and means interposed between said head and hanger and having a serrated portion coöperating with a serrated portion on one of said parts for adjustably holding the head in a given position.

The invention is illustrated on the accompanying sheet of drawings in which,

Figure 1 is a rear elevation of brake mechanism embodying my invention, and

Fig. 2 is a side elevation of the same.

The various novel features of my invention will be apparent from the following description and drawings and will be particularly pointed out in the appended claims.

By referring to the drawings, it will be noted that I have provided a brake beam 10 provided with a trunnion 11 upon which is adjustably rotatably mounted a brake head 12 having side walls 13 and 14 with bearing portions 15 and 16 respectively for the reception of the brake beam trunnion 11. Also pivotally mounted on the trunnion 11 is a hanger 17, the upper eye portion of which may be pivoted to any portion of the truck, the lower portion of the hanger 17 having a bearing 18 for the reception of the trunnion 11, said bearing portion 18 of the hanger 17 being located intermediate the bearing portions 15 and 16 of the brake head.

In order that the braking surface of the brake shoe at all times may remain concentric with the tire of the associated wheel and also prevent uneven wear of the brake shoe, it is necessary that the brake head be adjustably mounted on the brake beam trunnion for movement about the center of the brake beam trunnion. At the same time normally the brake head must not be permitted too free a movement relative to the brake beam trunnion. Preferably the brake head should be held yieldably in adjusted position or any other position which it may assume in accordance with working conditions. To this end I have provided yieldable means which is interposed between the brake head and a suitable supporting member associated therewith.

In connection with my present invention, I have shown a spring plate 19, one end of which is secured to the front wall 20 of the brake head by any suitable means, such as a rivet 21. The lower portion of this spring plate is looped around the hanger bearing 18 and its end portion is provided with serrations or teeth 22 which coöperate with corresponding serrations 23 formed in one of the lower quarters of the hanger bearing 18.

Normally, by means of this arrangement, the brake head is maintained in a given position so that the braking surface of the shoe is concentric with the tire of the associated wheel. If, however, for any reason it is necessary for the brake head to be adjusted about the center of the brake beam trunnion for correcting the braking engagement between the shoe and the associated wheel, the same will be permitted by a relative movement of the serrated portions 22 and 23 of the resilient member 19 and hanger bearing 18 respectively. This action is automatic. The brake head then will be held yieldably in its new adjusted position.

It is apparent that there may be various modifications of the invention herein particularly shown and described, and it is my intention to cover all such modifications which do not depart from the spirit and scope of the invention as set forth in the following claims.

I claim:

1. In brake mechanism, the combination of a brake head, a hanger associated therewith, and yieldable means interposed between the front wall of said head and hanger having a serrated portion coöperating with the serrated portion on one of said other parts for adjustably holding the head in a given position.

2. In brake mechanism, the combination of a brake head, a hanger associated therewith having a bearing with a serrated portion, and a spring member, one portion of which is anchored and another portion of which is serrated for coöperating with the serrated portion of said hanger for yieldably holding the brake head in a given position.

3. In brake mechanism, the combination of a brake head, a hanger associated therewith having a bearing with a serrated portion, and a spring, one portion of which is secured to said brake head and another portion of which is serrated for coöperating with the serrated portion of said hanger for yieldably holding the head in a given position.

4. In a brake mechanism, the combination of a brake head, a hanger associated therewith having a trunnion bearing portion which is serrated, and a spring member, one portion of which is secured to said head and another portion of which is serrated for coöperating with the serrated portion of said hanger for yieldably holding the brake head in a given position.

5. In brake mechanism, the combination of a brake beam having a trunnion, a brake head mounted on said trunnion and having side walls, a hanger having a trunnion bearing located between said side walls and having a serrated portion, and a spring secured to said brake head and having a serrated portion engaging the serrated portion of said hanger for adjustably holding the brake head in a given position.

Signed at Chicago, Illinois, this 8th day of November, 1917.

ARMAND H. PEYCKE.

Witnesses:
CHAS. L. BYRON,
A. F. WADE.